Sept. 13, 1938.  A. A. WELLS ET AL  2,129,751
OPERATION OF A CENTRIFUGE FOR SEPARATING
THE PETROLEUM OIL FROM SULPHURIC ACID
Filed May 25, 1934  2 Sheets-Sheet 1

Alfred A. Wells  Inventors
David F. Edwards
By William E. Currie Attorney

Sept. 13, 1938.  A. A. WELLS ET AL  2,129,751
OPERATION OF A CENTRIFUGE FOR SEPARATING
THE PETROLEUM OIL FROM SULPHURIC ACID
Filed May 25, 1934   2 Sheets-Sheet 2

Alfred A. Wells
David F. Edwards  Inventors
By William E. Currie  Attorney

Patented Sept. 13, 1938

2,129,751

UNITED STATES PATENT OFFICE 2,129,751

OPERATION OF A CENTRIFUGE FOR SEPARATING THE PETROLEUM OIL FROM SULPHURIC ACID

Alfred A. Wells, Roselle Park, and David F. Edwards, Elizabeth, N. J., assignors to Standard Oil Development Company, a corporation of Delaware Application May 25, 1934, Serial No. 727,504

3 Claims. (Cl. 196—40)

This invention relates to a method of treating hydrocarbon oil with a reagent forming a centrifugally separable extract or sludge, for example with an acid, such as sulphuric acid or equivalent reagents, and relates particularly to a method of treating petroleum lubricating oil and separating clean oil, sludge and recovered acid.

The acid treatment of hydrocarbon oils for various purposes such as the removal of substances that impart color and substances that render the oil unstable under the conditions encountered in use and in storage is well known in the art. An important purpose of treating lubricating oils with acid is to remove compounds that change either spontaneously or under the influence of heat or light, such change resulting in the formation of gummy insoluble products which tend to lessen the lubricating value of the oil.

The method generally adopted of treating oils for the production of lubricating oils of the desired properties is as follows:

The oil to be treated is first, in proper quantity, agitated with sulphuric acid for a given period of time, allowed to settle, and the free acid and products formed by the acid reaction, commonly known as acid sludge, withdrawn. The oil is then subjected to a second similar treatment with a suitable neutralizing agent such as an aqueous solution of sodium hydroxide, allowed to settle, and the waste alkali and products of the reaction withdrawn. The oil is then washed with water until it is free of the alkali. The oil may then be heated and air blown and finally treated by filtering through a decolorizing agent such as fuller's earth. The oil by this method is generally treated in batches and undesirable changes in the oil are effected.

Objects of the present invention are to lessen the period of time required in the treatment of the oil and also to materially reduce the cost of manufacturing lubricating oils.

Other objects are to provide a process for continuously separating clean oil, sludge and acid and controlling the time of contact of the oil and the acid.

These and other objects of the invention will be fully understood from the following description of the method and a centrifuge used in this process, read in connection with the accompanying drawings of the centrifuge in which.

Figure 3:
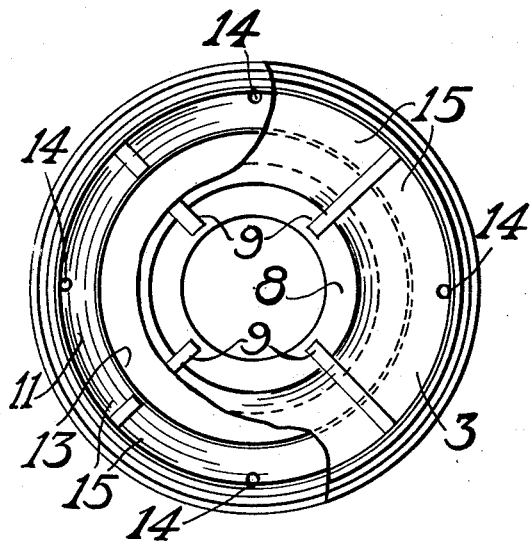
Fig. 3 represents a cross sectional view partly broken away on the line III—III of Fig. 1.
Figure 2:
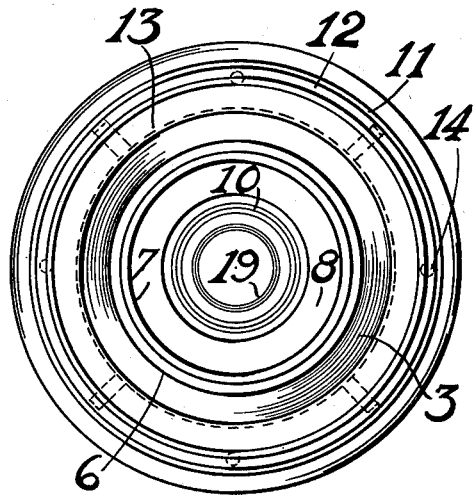
Fig. 2 represents a cross-sectional view on the line II—II of Fig. 1.

Referring to the drawings, numeral 1 represents a bowl shell driven by the driving and supporting spindle 2. A bowl top 3 is removably secured to the shell by the flanged ring 4. A tight joint between the bowl shell 1 and bowl top 3 is made by a gasket ring 5. The bowl top 3 has an inwardly and upwardly extending annular flange 6 at its upper end. This flange 6 is recessed on the inside and also threaded to receive a ring 7. A washer-like ring 8 is supported by the recessed part of flange 6 and ribs 9, and is held in position by ring 7. The washer-like ring 8 is in spaced relation to the periphery of the annular tube 10. The space between the periphery of the annular tube 10 and washer-like ring 8 is varied by the use of rings of varying inside diameters.

The bowl top 3 has a second inwardly and upwardly extending annular flange 11 in spaced relation to bowl shell and ring 8 and is part of the bowl top forming an annular space on the outside of the inner periphery of the bowl top 3. This flange 11 is recessed on the inside and also threaded to receive a ring 12. A washer-like ring 13 is supported by the recessed part of flange 11 and is held in position by the ring 12. The washer-like ring 13 is in spaced relation to the inner periphery of the bowl 1 and forms a direct passage between the inner part of the bowl 1 by means of opening 14 and annular space 15. Ring 13 also can be varied in size. Openings 14 may be of any shape, such as circular, square, etc., and connects the inner part of the bowl with the annular space 15.

Within the bowl is a liner 16 comprising a series of spaced-apart frusto-conical discs. Above the liner is a top disc 17 which has a neck at its upper end, the annular tube 10 forming a discharge outlet within and concentric to and spaced from the feed tube 19. The annular tube 10 is spaced from and concentric to, and extends above the annular space formed by flange 6. Outlets 20 are provided for passage of the material from the feed tube 19 to the inner part of the bowl 1. Channels 21 extend upwardly through the spaced-apart frusto-conical discs.

Figure 1:
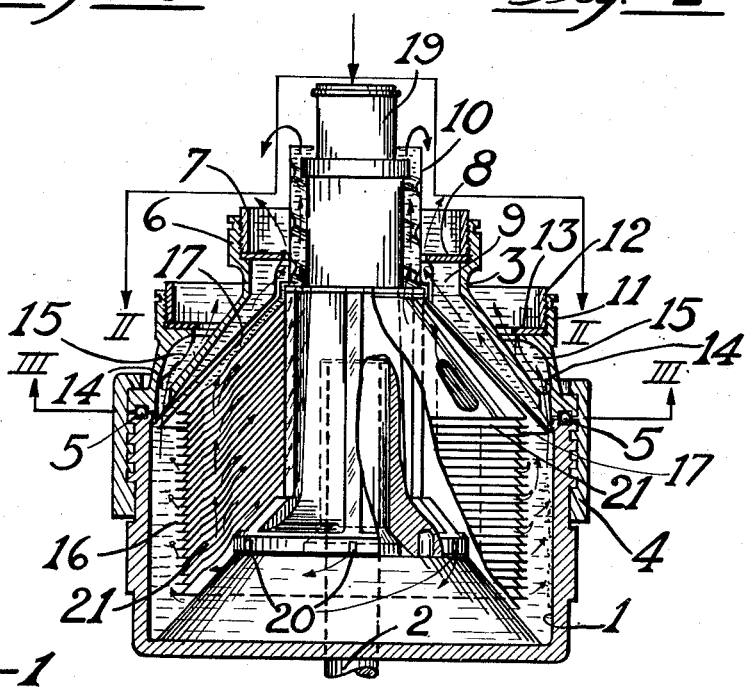
Fig. 1 represents a vertical sectional view of a separating bowl in elevation, a cutaway section of a feed tube and a sectional and side view of a "liner" comprising a series of frusto-conical "discs"
Figure 7:
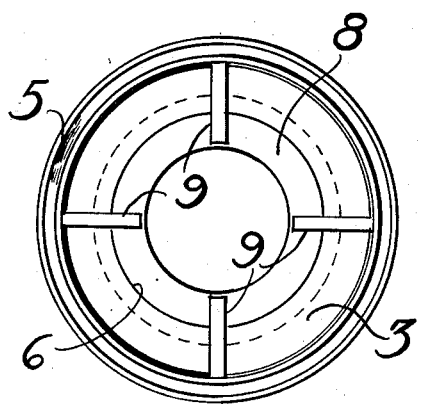
Fig. 7 represents a cross sectional view on the line V—V of Fig. 4.
Figure 6:
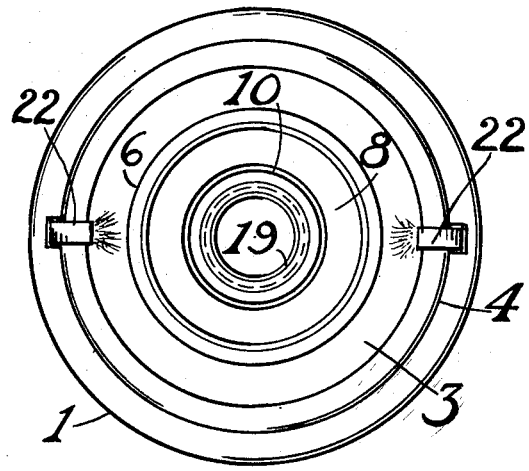
Fig. 6 represents a cross sectional view on the line IV—IV of Fig. 4.
Figure 4:
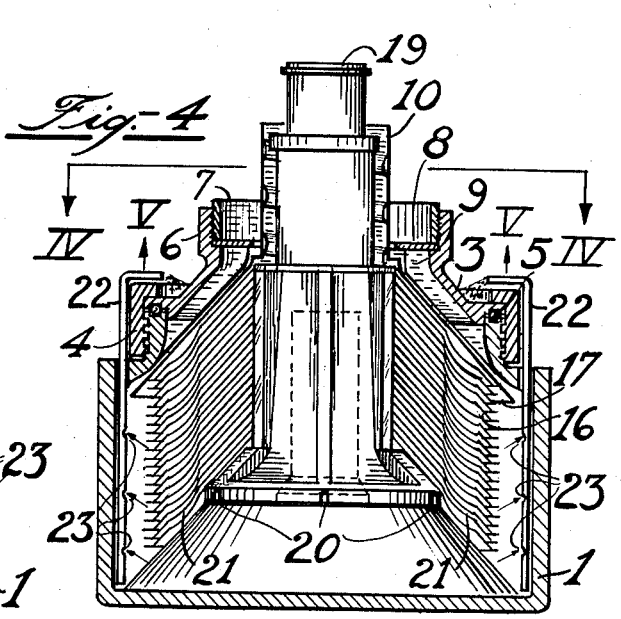
Fig. 4 represents a sectional view of a separating bowl and shows a modification of the separating bowl.

Referring to Fig. 4, a bowl similar to that of Fig. 1 is shown with a modification in that a tube 22 with openings 23 is provided in place of outlets formed by washer-like ring 13. This tube may be rectangular or circular in form.

The tube passes vertically through the centrifuge bowl at or near periphery and then turns towards the axis to such a distance that the flow of liquid through said tube is regulated.

Figure 5:
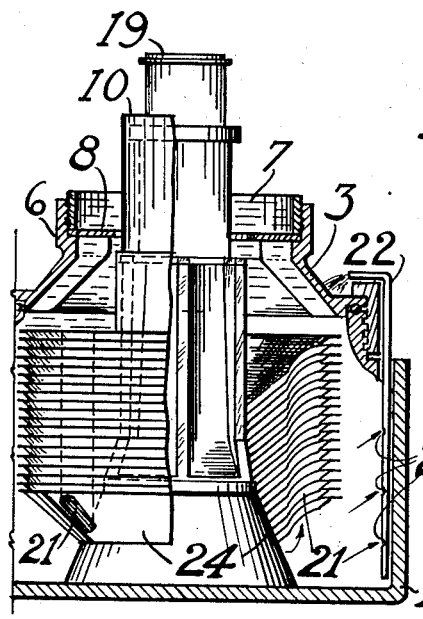
Fig. 5 represents a sectional view of a separating bowl showing another modification of the separating bowl.

Referring to Fig. 5, another modification is shown in which the liner 24 of a series of spaced-apart frusto-conical discs is shown in inverted form. Collecting vessels (not shown) are provided for the materials discharged from the outlets formed by annular space between feed tube 19 and annular tube 10, washer-like ring 8, washer-like ring 13 and tube 22.

In accordance with the preferred form of this invention, sulphuric acid having a strength of 85% to 100%, or fuming acid, is used for treating lubricating or heavier oils. The oil and acid are continuously and rapidly mixed with a short time of contact in a mechanical mixer. The mixing must be violent enough to cause a dispersion to such a degree that a homogeneous mixture of two ingredients results. The mixture may be passed directly to the centrifuge for separation or through a reaction chamber of desired size to allow time for completion of the reaction before passing into the centrifuge.

The mixture is then passed into a centrifugal separator of the type disclosed above by means of feed tube 19. The centrifuge separator is first primed with acid before the addition of any oil-acid mixture. The acid, being heavier, goes to the outside of the bowl and an outlet, such as that formed by ring washer 13, or tube 22, is used to remove it from the bowl and a constant level of acid is maintained. By maintaining a constant level, means are provided to compensate for the variations in the feed stock. An intermediate layer of sludge is formed which is removed through the outlets formed by ring washer 8. The clean oil layer in the bowl is removed through outlet formed between the tube 19 and tube 10.

In the centrifuge the zones of separation of acid, sludge and oil are controlled by the varying diameters of the washer-like rings 8 and 13. Where the tube 22 is used, the distance of the exit of the tube from the axis of the centrifuge is adjusted to regulate the discharge of varying quantities of separated acid. The necessity for such adjustment is shown in connection with the treatment of various stocks, e. g. on a reduced crude which contains considerable amounts of asphalt, substantially no acid will be separated, but on clean stocks such as Pennsylvania cylinder stock, overhead distillates, hydrogenated lubricating oils, etc., considerable quantities of acid, perhaps up to approaching half the total amount of acid used, will be separated.

The quantities of acid used in treating mineral oils vary from 5 to 100 pounds per barrel of oil. For example, 40 pounds of sulphuric acid of a concentration of 98% is used to treat a 50 gallon barrel of Ranger-Burbank crude bottoms having a Saybolt viscosity of 220 seconds at 210° F. The oil and acid are mixed for 1 to 15 minutes and the mixture rapidly passed through the centrifuge. The ingredients recovered are ½ to 2% acid, 28 to 30% of sludge and 68 to 70% of clean oil.

Overhead stock, such as Pennsylvania lubricating oil distillate having a Saybolt viscosity of 350 seconds at 100° F., is treated with 10 pounds of 98% sulphuric acid per one 50 gallon barrel of oil. The oil and acid are mixed for a period of time up to one hour and the resulting mixture separated by passing through the centrifuge. The ingredients recovered are 20% of the acid used having a gravity of 50° Baumé, 6 to 8% of sludge and 92 to 94% of clean oil figured on the oil treated. The addition of 0.1 to 1.0% water may aid the coagulation and is especially desirable in treating lighter lubricating oils.

A blend of 30% Pennsylvania bottoms and 70% hydrogenated overhead distillate is treated with 10 pounds of sulphuric acid of 98% concentration for each 50 gallon barrel of oil. The oil and acid are mixed for a period of time up to one hour and passed through a centrifuge. The ingredients recovered are about 15% of the acid used, about 6% of sludge and about 94% of clean oil based on oil charged.

The oil treated and separated by this method shows a smaller loss of oil than in the method used heretofore. Likewise, the time of treating the oil is materially reduced. With the shorter time of contact less sulphonation takes place, and therefore less oil soluble sulphonates are formed.

It is not intended that the invention be limited to any of the specific examples hereinabove given or to any theories advanced as to the operation of the invention, but in the appended claims it is desired to claim all novelty in the invention as broadly as the prior art permits.

We claim:

1. In the operation of a centrifuge for separating a petroleum oil from the reagents with which it has been contacted, the improvement which comprises passing a mixture of oil and a sludge-forming reagent into a centrifuge, forming and maintaining three separate liquid layers in the centrifuge withdrawing the oil from the central liquid layer formed in the centrifuge, withdrawing the reagent from the outer layer formed in the centrifuge through a confined passage into an enlarged zone and then through an opening in spaced relation to the periphery predetermined in accordance with the conditions of operation whereby a constant depth of the outer layer of heavy liquid in the centrifuge is maintained, and withdrawing a mixture of reaction products, oil, and reagent from an intermediate layer through an opening of a size predetermined in accordance with the conditions of operation.

2. Method according to claim 1, in which the predetermined openings are regulated according to the petroleum oil being treated and the quantity of acid used in said treatment.

3. In the operation of a centrifuge for separating the petroleum oil from sulphuric acid with which it had been contacted and the reaction products formed thereby which comprises passing a mixture of oil and sulphuric acid into a centrifuge, forming and maintaining three separate liquid layers in the centrifuge, withdrawing the oil from the central liquid layer formed in the centrifuge, withdrawing sulphuric acid from the outer layer formed in the centrifuge thru a confined passage into an enlarged zone and then thru an opening in spaced relation to the periphery predetermined in accordance with the conditions of operation whereby a constant depth of the outer layer of the heavy liquid in the centrifuge is maintained and withdrawing a mixture of reaction products, oil and sulphuric acid from an intermediate layer thru an opening of a size predetermined in accordance with the conditions of operation.

ALFRED A. WELLS.
DAVID F. EDWARDS.